United States Patent [19]

Laursen et al.

[11] Patent Number: 4,806,289

[45] Date of Patent: Feb. 21, 1989

[54] METHOD OF MAKING A HOLLOW LIGHT PIPE

[75] Inventors: Larry J. Laursen, Midland; Virgil W. Coomer, Shepherd; Walter J. Schrenk, Midland, all of Mich.

[73] Assignee: The Dow Chemical Company, Midland, Mich.

[21] Appl. No.: 3,777

[22] Filed: Jan. 16, 1987

[51] Int. Cl.⁴ .......................... B29D 11/00; G02B 6/20
[52] U.S. Cl. ..................................... 264/1.5; 264/173; 350/96.32; 350/96.34
[58] Field of Search .......................... 350/96.32, 96.34; 264/1.5, 1.6, 2.7, 514, 173

[56] References Cited

U.S. PATENT DOCUMENTS

| | | |
|---|---|---|
| 3,261,350 | 7/1966 | Wallace . |
| 3,308,508 | 3/1967 | Schrenk . |
| 3,386,043 | 5/1963 | Marcatili . |
| 3,436,141 | 4/1969 | Comte . |
| 3,498,286 | 3/1970 | Polayni . |
| 3,556,635 | 5/1967 | Schrenk et al. ........................ 264/1.5 |
| 3,583,786 | 6/1971 | Marcatili . |
| 3,641,332 | 2/1972 | Reick et al. . |
| 3,740,112 | 6/1973 | Lundgren . |
| 3,740,113 | 6/1973 | Cass . |
| 3,843,865 | 10/1974 | Nath . |
| 3,902,880 | 9/1975 | Strack . |
| 3,973,828 | 8/1976 | Onoda et al. ........................ 350/96.32 |
| 3,980,390 | 9/1976 | Yamamoto et al. . |
| 3,999,834 | 12/1976 | Ohtomo et al. . |
| 4,000,416 | 12/1976 | Goell ............................ 350/96.33 X |
| 4,053,205 | 10/1977 | Miller . |
| 4,161,500 | 7/1979 | Schleinitz et al. . |
| 4,165,152 | 8/1979 | Shiraishi et al. . |
| 4,167,305 | 9/1979 | Ichiba et al. . |
| 4,183,617 | 1/1980 | Isaacs et al. . |
| 4,220,395 | 9/1980 | Wang et al. . |
| 4,252,403 | 2/1981 | Salisbury . |
| 4,270,840 | 6/1981 | Uchida et al. . |
| 4,363,533 | 12/1982 | Stowe et al. . |
| 4,392,715 | 7/1983 | Bonewitz et al. . |
| 4,437,727 | 3/1984 | Treber . |
| 4,453,803 | 6/1984 | Hidaka et al. . |
| 4,458,986 | 7/1984 | Yuto et al. . |
| 4,490,008 | 12/1984 | Murakami et al. . |
| 4,505,542 | 3/1985 | Clarke . |
| 4,505,543 | 3/1985 | Ueba et al. . |
| 4,511,209 | 4/1985 | Skutnik . |
| 4,521,351 | 6/1985 | Ohtsuka et al. . |
| 4,522,431 | 11/1985 | Allemand et al. . |
| 4,530,569 | 7/1985 | Squire . |
| 4,547,040 | 10/1985 | Yamamoto et al. ............. 350/96.34 |
| 4,568,146 | 2/1986 | Ueba et al. ........................ 264/1.5 X |
| 4,585,306 | 4/1986 | Ohmori et al. . |
| 4,689,483 | 8/1987 | Weinberger ..................... 250/231 R |
| 4,689,926 | 8/1987 | Smith ................................. 455/613 |

FOREIGN PATENT DOCUMENTS

| | | |
|---|---|---|
| 0097325 | 4/1984 | European Pat. Off. . |
| 165842 | 5/1985 | European Pat. Off. . |
| 178088 | 8/1985 | European Pat. Off. . |
| 0173266 | 3/1986 | European Pat. Off. . |
| 53-42261 | 10/1978 | Japan . |
| 55-15293 | 4/1980 | Japan ................................... 264/173 |
| 58-18608 | 2/1983 | Japan . |
| 179434 | 8/1984 | Japan . |
| 60-54830 | 3/1985 | Japan . |
| 60-242404 | 12/1985 | Japan . |
| 60-247605 | 12/1985 | Japan . |

OTHER PUBLICATIONS

Harrington, J. A., "Medical Need Drive IR Fiber Development", *Photonics Spectra*, Jul. 1987, pp. 61–63.

*Primary Examiner*—James Lowe
*Attorney, Agent, or Firm*—Harness, Dickey & Pierce

[57] ABSTRACT

A hollow light conductor with enhanced light-transmitting properties is formed by the coextrusion of polymeric materials. The hollow light conductor comprises a continuous annular core layer encased in inner and outer cladding layers.

8 Claims, 4 Drawing Sheets

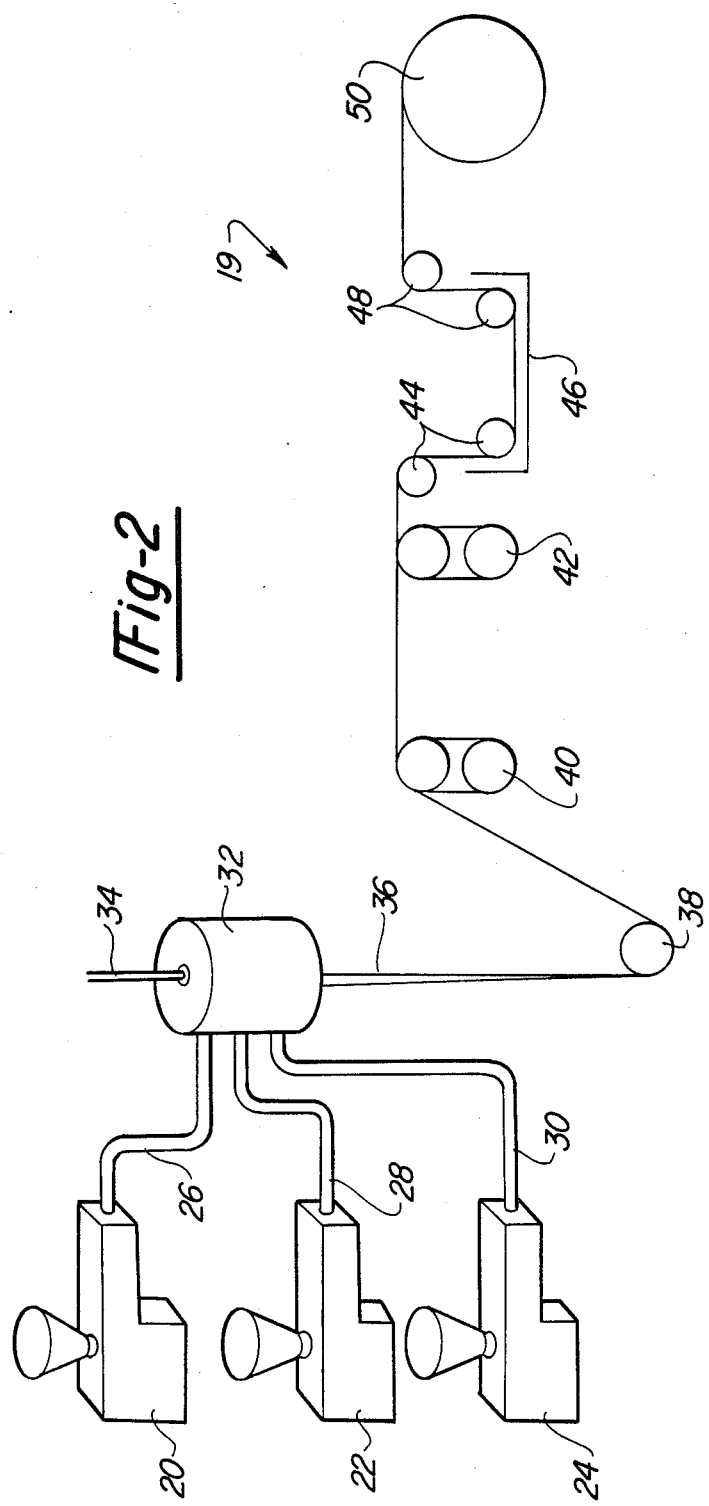

METHOD OF MAKING A HOLLOW LIGHT PIPE

BACKGROUND OF THE INVENTION

The present invention generally relates to fiber optic systems and, more particularly, to a method of making a hollow polymeric light conductor by coextrusion.

Fiber optics have revolutionized the communications field and are finding many applications in the medical field. Fiber optics are also proving useful in areas as diverse as computer systems, automotive systems, aerospace systems, and advertising signs. Thus, there is an ever-present need for refining and improving upon fiber optic systems for use in a wide range of industries. In this regard, the following patent applications of the assignee are hereby incorporated by reference: Larry J. Laursen, et. al., U.S. patent application Ser. No. 003,774, entitled "A Method Of Making A Polymeric Optical Waveguide By Coextrusion", filed on even date herewith; Theodore L. Parker, et. al., U.S. patent application Ser. No. 088,083, entitled "Polymeric Optical Fiber", filed Jan. 21, 1987, now abandoned, in favor of Ser. No. 014,997, filed on Oct. 8, 1987 herewith; and Theodore L. Parker, et. al., U.S. patent application Ser No. 831,775, entitled "Polymeric Optical Fiber", filed on Feb. 20, 1986.

A variety of translucent/transparent materials, such as glass and amorphous polymers, have been utilized as light-conducting fibers in fiber optic systems. However, polymers offer several advantages over other fiber optic materials for applications where a small degree of signal loss is acceptable. For example, plastics have a higher numerical aperture than glass. Additionally, polymer fibers are relatively inexpensive and lightweight. They are also flexible and resistant to breakage, thereby facilitating assembly and installation. Other advantages include the fibers' immunity to electromagnetic interference. This is particularly important in automotive applications, where sophisticated multiplex data systems are subjected to electromagnetic interference generated by the alternator and spark plugs.

Light-conducting fibers in fiber optic systems are generally encased in a sheath or cladding of material having a lower index of refraction than the conducting fibers. Proper indices of refraction of the conducting material and cladding are necessary to provide a high degree of internal reflection of light traveling down the fiber and to provide an appropriate numerical aperture for the transmitting system. The greater the difference in refractive indices, the greater the numerical aperture and, thus, the more light will be trapped and transmitted through the optical waveguide. Accordingly, the lower index of refraction of the cladding relative to that of the core material enables the cladding layer to reflect light inwardly toward the core as the light travels down through the conducting core. While air has a lower index of refraction (i.e., 1.0) than any plastic material that could be used for the cladding, the plastic cladding protects the surface of the core from dust, dirt, and scratching. Thus, a plastic cladding is desirable since it can provide a smooth and continuous interface at the surface of the core, and thereby minimize the dispersion of light into the surrounding environment.

Fiber optic assemblies are particularly useful in examination devices involving imaging. For example, fiber optic assemblies are highly useful in medical probes such as laryngoscopes, bronchoscopes and intravenous or intracardiac examining devices. They can also be advantageous in optical examining devices such as borescopes. Such fiber optic assemblies have generally included a first bundle of fibers for imaging purposes and a second bundle of fibers for transmitting light to the end of the assembly. In such an assembly, the light transmitting fibers are generally disposed around the image forming bundle to both guide the image forming bundles and illuminate the target area for imaging. Such assemblies are typically made with glass fibers in a hand lay-up procedure, and are therefore quite expensive. This operation is not only laborious and delicate, but the resulting conductor has reduced efficiency because a significant portion of the area occupied by the light transmitting bundle is not conductive due to the gaps between the individual glass fibers.

One attempt at forming a continuous light conducting ring involved the drilling of a solid polystyrene core and depositing a layer of polymethyl methacrylate (PMMA) on either side of the core. However, problems encountered using this method included difficulties in maintaining the dimensions and physical properties of the conductor, and an inability to obtain good smooth surfaces between the cladding and conducting layers. Uniform dimensions and physical properties and smooth interfaces are desirable to reduce light dispersion and increase light transmission.

Thus, it would be desirable to provide a continuous annular light conductor with uniform dimensions and physical properties to ensure minimal dispersion of light and a high degree of light transmission.

It would also be desirable to provide a hollow light conductor with smooth surfaces between the cladding and core conducting layers to further enhance light transmission.

It would further be desirable to provide a hollow light conductor with a continuous annular core for maximizing light conductivity.

It would also be highly desirable to provide a continuous high-speed and, therefore, low cost method and apparatus for manufacturing hollow light conductors with the above properties which ensure the minimal dispersion of light and a high degree of light transmission by the light conductor.

It would further be desirable to provide a method of making a hollow light conductor which has a very small diameter and wall thickness.

SUMMARY OF THE INVENTION

The present invention provides a hollow light conductor comprising a tri-layer polymer tube with uniform dimensions and physical properties. Specifically, the light conductor produced by the present invention has a continuous annular light conducting layer encased by inner and outer cladding layers with smooth interfaces between the conducting and cladding layers. The present invention further provides a high-speed continuous method and apparatus for creating the hollow light conductor with the above stated properties.

The method of constructing a hollow light conductor according to the present invention includes the steps of heating and plasticizing the light conducting and cladding materials through separate extruders, and then processing them through a coextrusion die. The coextrusion die of the present invention forms and combines the individual tubular layers of materials of the hollow light conductor. Core gas is metered during coextrusion to the interior of the tube in part to prevent the tube from collapsing before being cooled. Smooth surfaces between the layers of the tube are obtained because the materials are joined while the materials are in the melt region. The material, now a tri-layered tube with a solid annular light conducting layer of polymer, is discharged from the die, and then drawn. The combination of drawing and the controlled core gas pressure sets the sizing of the tube in regard to the tube diameter and its wall thickness. Drawing should preferably take place at a temperature that will allow molecular orientation of the material. It was found that the extruded tubular structure will retain its tubular configuration, even though it is rapidly drawn prior to being cooled. The material is next quickly cooled to a temperature that will retain the desired orientation. The cooled hollow light conductor of the present invention can then be wound on a spool and packaged.

Further features and advantages of the present invention will become more apparent from the following specification taken in connection with the drawings wherein:

BRIEF DESCRIPTION OF THE DRAWINGS

FIG. 2 is a schematic representation of a method and apparatus for constructing a hollow light conductor in accordance with the present invention.

DETAILED DESCRIPTION OF THE PREFERRED EMBODIMENT

Figure 1A:
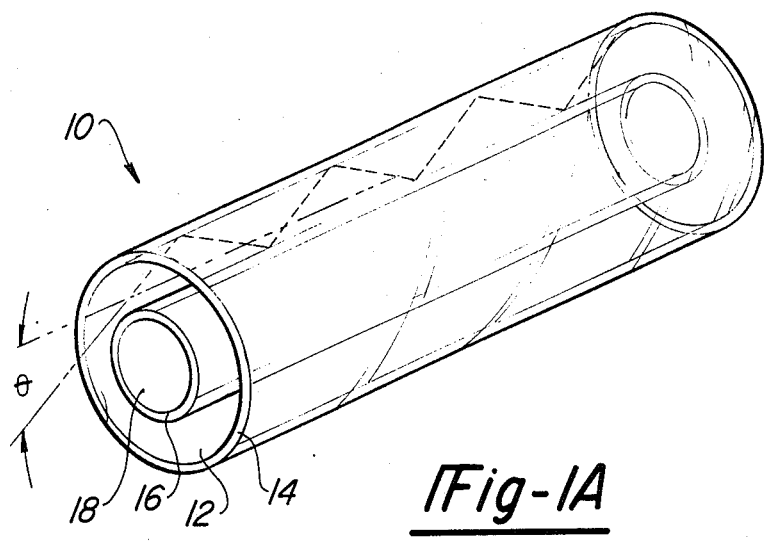
FIG. 1A is a perspective view of a hollow light conductor of the present invention, particularly illustrating the transparent or translucent quality of the conductor.
Figure 1B:
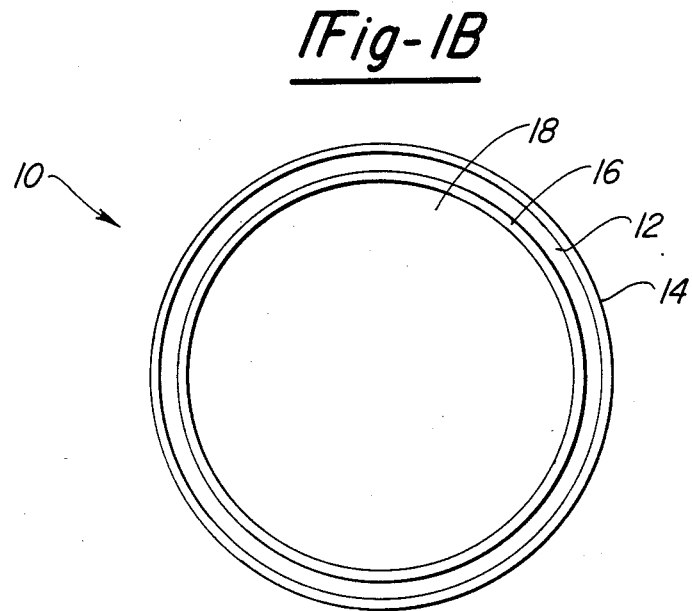
FIG. 1B is a cross-section view of a hollow light conductor of FIG. 1A, particularly illustrating the tri-layer construction of said conductor which comprises a solid annular layer of light conducting core material between two cladding layers.

Referring to FIGS. 1A and 1B, a hollow light conductor 10 manufactured according to the present invention is shown. The hollow light conductor or pipe 10 generally comprises a three-layered tubular structure which is constructed using polymeric materials. The hollow light conductor 10 comprises a light conducting core layer 12, an outer cladding layer 14, and an inner cladding layer 16, with a central aperture 18 running the length of the conductor. It should be appreciated that the diameter and thickness of the hollow light conductor 10 and its layers can be varied to suit particular diameter and thickness requirements. However, one of the advantages of the present invention is that it permits hollow light conductors to be produced with very small diameters and wall thicknesses. Additionally, a hollow light conductor according to the present invention may also be provided with a jacket along eiher or both the inside and outside surfaces. Such a jacket could be made from a medical grade polyurethane or other suitable materials, such as materials which will provide lubricity.

It should be noted that the thickness of the annular core 12 is exaggerated in FIG. 1A in order to illustrate the internal reflections of light provided by the cladding layers 14 and 16. Specifically, the broken line in FIG. 1A depicts the path of travel of a light ray through the conducting core 12 as it is being reflected at the surface of the inner and outer cladding layers 14 and 16. The angle $\theta$ represents the angle as of this light ray as it enters the core 12. The numerical aperture of the core 12 is defined by the maximum value of the angle $\theta$ which will permit the cladding layers 14 and 16 to reflect light inwardly through the core 12.

In order to effectuate the reflection of light by the cladding layers 14-16 into the conducting core layer 12, the material for the cladding layers 14-16 is selected to possess a lower index of refraction than the material selected for the core layer 12. A maximum difference in the refractive indices of the cladding and core layers is desirable, because it provides a larger numerical aperture for the incident being transmitted light to and from the core layer. The conducting core material selected should also be clear, transparent, or at least translucent to permit an effective transmission of light through the hollow light conductor. Additionally, any polymer utilized for the core layer 12 should preferably be in the amorphous rather than crystalline state.

Preferred materials for constructing the optical core 12 include polystyrene, which has a refractive index of approximately 1.59. When polystyrene is used as the conducting core layer 12, polymethyl methacrylate (PMMA) is preferred for the cladding layers 14-16. PMMA has a refractive index of approximately 1.49. It should be appreciated, however, that other polymeric materials with sufficient differences in their indices of refraction (i.e., more than 0.03) can be employed. For example, PMMA or styrene alpha-methylstyrene (SAMS) could be used for the conducting core layer 12 and polyvinylidene fluoride (PVDF) could be used for the cladding layers 14-16. Since polyvinylidene fluoride has a refractive index of 1.42, a difference in refractive indices of 0.07 would be provided. It should further be appreciated that the polymeric material used for the core and cladding layers need not be composed of single polymers, but could be composed of suitable copolymers. In accordance with the principals of the present invention, the size of the tubes produced can be 2-3 mm. (i.d.) or less, and the wall thickness can be 1 mm. or substantially less. In one embodiment of the present invention, the polystyrene core layer 12 has a diameter of approximately 1.0 mm. and a thickness of approximately 0.2 mm. The thickness of the cladding layers 14-16 are selected in the range of 20:1 to 10:1 in a ratio of core to cladding thickness. These ratios are determined by the relative extrusion rates of the core and cladding materials. Additionally, the overall wall thickness and diameter of the tube is determined by the core gas pressure and the drawing rate, as will be more fully described below. Thus, for example, an increase in the tube diameter can be achieved by increasing the core gas pressure. Likewise, the diameter and wall thickness can be decreased by increasing the draw rate.

Referring to FIG. 2, a schematic representation of an apparatus 19 for constructing the hollow light cylinder 10 is shown. The coextrusion process according to the present invention begins with the individual extrusion of the polymer materials used for the cladding and the core. A first hopper-fed extruder 20 is used for the inner cladding material, a second hopper-fed extruder 22 is used for the light conducting core material, and a third hopper-fed extruder 24 is used for the outer cladding material. The extruders 20-24 heat and plasticize the core and cladding materials. The plasticized materials are then forwarded to a coextrusion die 32 through extruder outlets 26–30, which are in fluid communication with the interior of the coextrusion die 32. It should be appreciated that if a single material is used for both cladding layers 14–16, then only a single extruder with two outlets need be provided. Although the extruders in FIG. 2 are depicted as hopper-fed, it should be appreciated that the extruders need not be hopper-fed, but may have any other suitable means for feeding the polymer into the extruder die 32. Thus, for example, gear pumps could be provided between the extruders 20–24 and the coextrusion die 32 for volumetric metering. Otherwise, the extruder outlets 26–30 could merely be comprised of adapters for connecting the extruders 26–30 to the coextrusion die 32. The coextrusion die 32 receives the plasticized extruder products and forms a tri-layer hollow light conductor 36 which has a substantially annular shape in cross-section. The coextrusion die 32 is also provided with a supply of core gas via conduit 34. The conduit provides a constant flow of an inert gas (e.g., air or nitrogen) to the interior of the die 32 to prevent the walls of the light conductor 36 from collapsing. The flow of gas should be controlled or metered to provide a desired tube diameter and wall thickness.

As further shown in FIG. 2, the coextruded light conductor 36, now having a core layer 12 and a pair of cladding layers 14–16, is discharged from the coextrusion die 32. A shroud (not shown) may be used to surround the light conductor 36 as it exits the coextrusion die 32 to prevent stray air currents from causing preferential cooling of portions of the light conductor. A water jacket (not shown) around the exiting light conductor may also be used as a radiant heat sink to begin quenching and stabilizing the materials of the exiting light conductor. The coextruded light conductor 36 then travels along a grooved idler pulley 38. The coextruded light conductor 36 is then wrapped around a first set of godet rolls 40 which draws the light conductor at a first predetermined speed. The light conductor 36 is then preferably wrapped twice around a second set of godet rolls 42 which runs at a second predetermined speed. The second set of godet rolls operates at a higher speed than the first set of godet rolls to stretch the light conductor, and thereby achieve a desired molecular orientation for the hollow light conductor. It has been found that the light conductor 36 retains its hollow and generally cylindrical shape, even though it is being rapidly drawn and/or stretched along and around the above described rollers. In the appropriate application, it should be appreciated that it may be unnecessary to draw or stretch the light conductor.

The hollow light conductor 36 then passes over a first set of rollers 44 and into a coolant bath 46. The light conductor is then removed from the coolant bath 46 via a second set of rollers 48 and then collected around a spooled winder 50. It should be appreciated that, although godet rollers are preferred, any roller mechanism suitable to prevent slippage of the material during drawing may be employed, such as serpentine rolls. Temperature controlled rollers may also be used to maintain desired temperatures during the drawing process. Yet another alternative to optimize orientation of the materials would be to control the draw zone temperature in an oven-like apparatus. Additionally, it should be understood that the temperature of the core and cladding materials should be above the glass transition temperatures of these materials, so that undue stress is not created in the light conductor. In general, the lower that the temperature is, the more stress will be created, and a higher molecular orientation will be achieved. However, the temperature should be sufficiently above the glass transition temperature to prevent the cladding from becoming brittle.

In one embodiment of the method according to the present invention, pellets of Dow polystyrene resin XT6069.02 are fed to the jack screw extruder 22. In order to assure high optical quality, the resin pellets should be as clean as possible and thoroughly dried. Thus, it may be desirable to provide a purified version of the XT6069.02 resin. The extruder 22 is 1.25 inches in diameter with a L/D of 20:1. The heater zones of the extruder 22 are set to 400° F. and the screw speed to 25 RPM. The extruder provides a melt to the coextrusion die 32 at 10 lbs/hr. Simultaneously Rhom and Haas PMMA VS 100 (which has been thoroughly dried) is fed to jack screw extruders 20–24. These extruders 20–24 are 0.75 inches in diameter and with a L/D of 20:1. The heater zones of the extruders 20–24 are set at 400° F. and the screw speed is 10 RPM. The inner cladding material extruder 20 provides a melt to the coextrusion die 32 at 0.8 lbs/hr., and the outer cladding material extruder 24 provides its melt to the die 32 at 1 lb/hr.

The coextrusion die 32 is set to about 420° F. using one or more heater bands around the coextrudion die. A core gas supply of air is conveyed to the die 32 at a pressure of 1-2 in. water and a full rate of speed of 20–60 cc/min. The coextruded three-layered tube 36 which exits the die 32 at about 420° F. is drawn or conveyed from die by the pulley 38 and cooled to about 280° F. It then travels around the first set of godet rolls 40 with a surface speed of 100 ft/min. and is cooled to 190° F. The light conductor tube 36 is then drawn by the second set of godet rolls 42 with a surface speed of 200 ft/min., and afterwards quenched or cooled in the air/coolant bath 46 to below the glass transition temperature of the core and cladding materials. The hollow light conductor 36 is then collected on the winder 50.

Figure 3A:
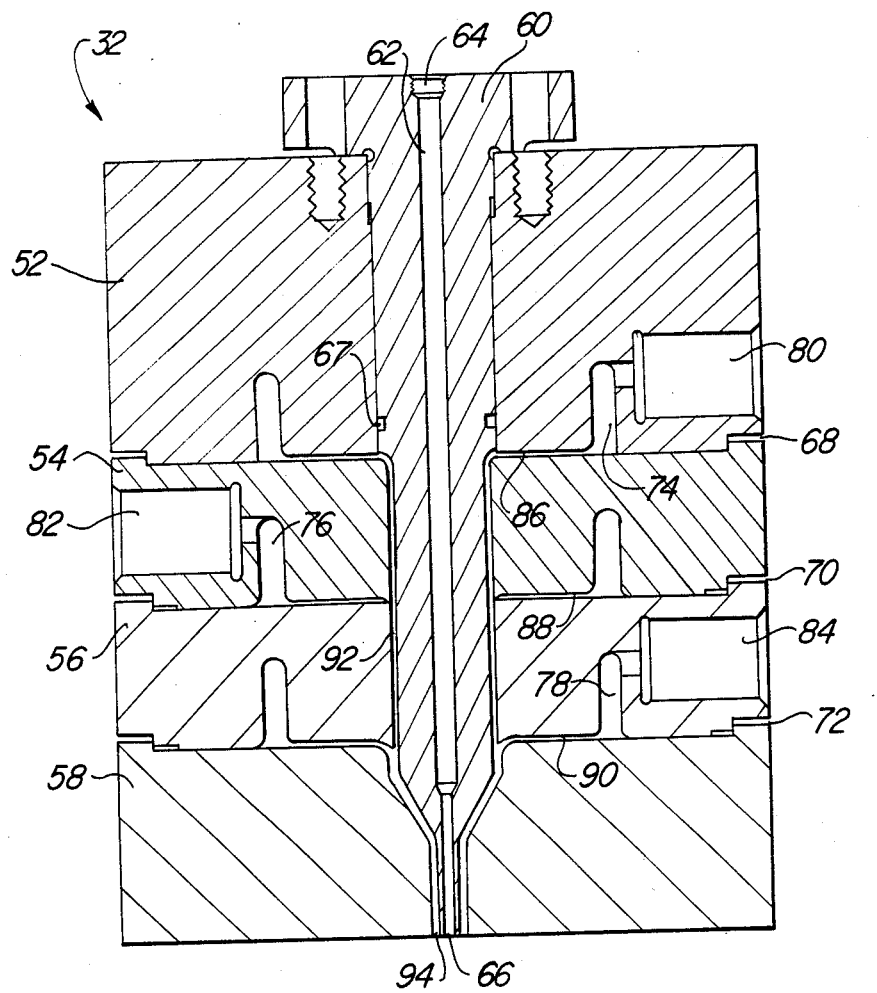
FIG. 3A is a cross-section view of a coextrusion die of the present invention.

FIG. 3A depicts a cross-sectional view of a coextrusion die 32 according to the present invention. As shown in FIG. 3A, the coextrusion die 32 includes four adjacent die plates 52–58, and a mandrel 60. Each of the die plates has a centrally disposed aperture, which are aligned with each other within the die 32. The die plates and the mandrel are preferably constructed of steel. The first die plate 52 and the third die plate 56 provide manifold plates which receive plasticized cladding material from their respective extruder outlets 26 and 30. The second die plate 54 provides a manifold plate which receives the plasticized core material from the extruder outlet 28. The fourth die plate 58 provides a converging plate for tapering the diameter of the combined flows of the core and cladding material through the die. The generally cylindrical mandrel 60 is axially disposed within the centrally disposed apertures defined by the die plate. The mandrel 60 has a centrally disposed generaly cylindrically shaped passageway 62 which has an inlet 64 for receiving the core gas from conduit 34. The passageway 62 further includes an outlet 66 for discharging the core gas into the aperture 18 of the hollow light conductor.

As shown in FIG. 3A, the first cladding die plate 52 has a length which will provide substantial lateral support for the mandrel 60 and keep it from cocking during assembly of the die 32. It should be appreciated, however, that the first die plate 52 need not be the longest die plate, but may be of any length sufficient to support the mandrel 60 in position during operation. Each die plate of the coextrusion die 32 is in a sealing arrangement with the die plate adjacent to it. Additionally, the mandrel 60 is provided with an annular groove 67 which is used to seat an o-ring seal. Clearances 68–72 are provided between adjacent plates at their outer periphery to ensure that the seal is made near the manifolds 74–78 formed in these plates.

The first, second and third manifolds 74–78 are respectively formed in their die plates, 52–58. Each manifold 74–78 extends in a circular band or ring which is generally coaxially disposed around the passageway 62. The manifold 74 is in fluid communication with a material inlet 80 which receives plasticized cladding from the extruder outlet 26. The manifold 76 is in fluid communication with a material inlet 82 which receives plasticized core material from the extruder outlet 28. The manifold 78 is in fluid communication with a material inlet 84 which receives plasticized cladding material from the extruder outlet 30. One or more of the manifolds 74–78 may be provided with a bleed outlet for cutting material flow to the die 32. Each of the manifolds 74–78 communicate with layer passageways 86–90, respectively, which run along the adjacent surfaces of the die plates 52–58.

The layer passageways 86–90 are in fluid communication with a common passageway 92. The common passageway 92 is tubular in configuration and communicates with the layer passageways 86–90. The common passageway 92 also runs along the portion of the mandrel adjacent to the converging die plate 58 and is in fluid communication with the annular outlet 94 of the die 32. The converging plate 58 and the lower portion of the mandrel 60 contained therewithin, converge in a funnel shaped configuration. Thus, the portion of the common passageway 92 defined by the adjacent surfaces of the converging plate 58 and the mandrel 60 reduces the diameter of the combined flows of core and cladding materials, and directs these flows out of the die 32.

Figure 3B:
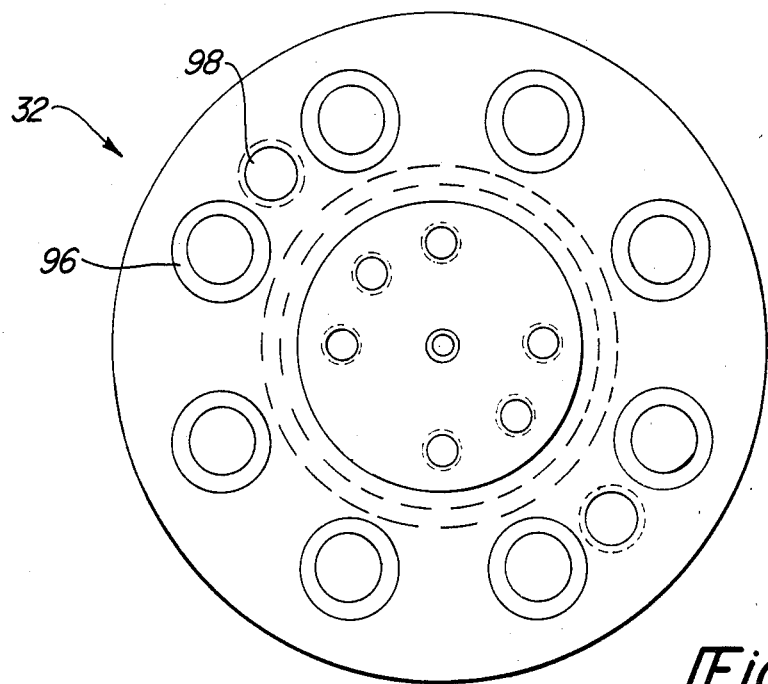
FIG. 3B is a top view of the coextrusion die of FIG. 3A.
Figure 3C:
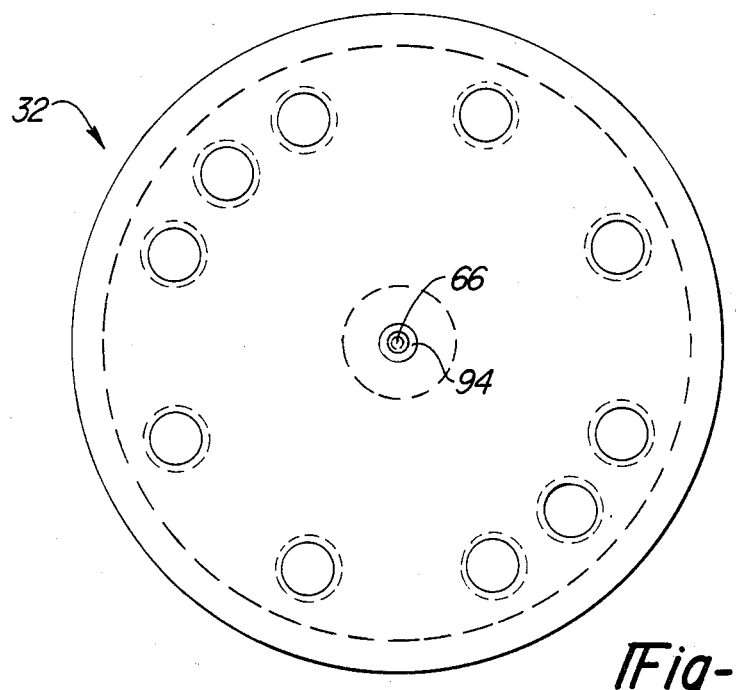
FIG. 3C is a bottom view of the coextrusion die of Figure 3A.

Referring to FIGS. 3B and 3C, a top elevation view and a bottom elevation view of the coextrusion die 32 are shown respectively. The die plates 52–58 of the coextrusion die are held together by a plurality of bolts which pass through the length of the coextrusion die plates via bolt holes 96. The mandrel 60 is also bolted to the first die plate 52. Each of the die plates and the mandrel have a plurality of jack screws disposed circumferentially around their periphery, such as at jack screw holes 98. The jack screws are used for separating these components for maintenance purposes and the like.

FIG. 3B particularly illustrates the annular shape of the outlet 94 of the die 32. It should be appreciated that the precise shape of the outlet 94 may be varied to fit the particular application of the light conductor.

In operation, the manifold plates 52 and 56 receive plasticized cladding material from the material inlets 80 and 84 respectively. The material is then forwarded to the manifolds 74 and 78 to provide uniform flow and distribution of the material around the die. The cladding material then flows from the manifolds 74 and 78 to the layer passageways 86 and 90, respectively, and through the common passageway 92. Simultaneously, the core material inlet 82 receives plasticized core material from its extruder outlet 28. The core material then flows through the manifold 76 and the layer passageway 88 until it reaches the common passageway 92. The core material is there intimately bonded to and encased within the inner and outer layers of cladding material. The core and cladding materials then flow through the outlet 94 of the die 32 which provides a substantially annular cross-sectional shape to the light conduct 36. Concomitantly with the above steps, core gas flows down the central passageway 62 and out through the outlet 66 to help maintain the desired shape of the coextruded light conductor. The material, now a hollow light conductor with an annular core layer 12, an outer cladding layer 14 and an inner cladding layer 16 is discharged from the coextrusion die 32 for further processing as described above.

As is apparent from the foregoing specification, the method and apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of constructing a hollow light conductor, comprising the steps of:
   heat plasticizing a core material which is capable of conducting light;
   heat plasticizing a cladding material which has an index of refraction that is lower than the index of refraction of said core material;
   coextruding said cladding material along the inner and outer surfaces of said core material to form a tri-layer hollow light conductor having smooth surfaces between said core material and said cladding material with said core material being formed in a predetermined shape; and
   cooling said light conductor below the glass transition temperatures of said cladding and core materials so that said light conductor will maintain said predetermined shape.

2. The method according to claim 1, wherein said predetermined shape is substantially annular.

3. The method according to claim 1, wherein said core material is polystyrene and said cladding material is PMMA.

4. The method according to claim 1, including the step of introducing a gas flow through the center of said hollow light conductor during said coextrusion step.

5. The method according to claim 1, wherein said light conductor is drawn around rolls which are operating at different speeds.

6. The method according to claim 1, wherein said light conductor is drawn at a temperature above the glass transition temperatures of said core and cladding materials to provide molecular orientation.

7. The method according to claim 1, wherein said core material is PMMA and said cladding material is PVDF.

8. The method according to claim 1, wherein said core material is SAMS.

* * * * *